(12) United States Patent
McNamee et al.

(10) Patent No.: US 8,260,638 B2
(45) Date of Patent: Sep. 4, 2012

(54) METHOD AND SYSTEM OF INSURING RISK

(75) Inventors: Jacqueline McNamee, New York, NY (US); Guy Williams, London (GB); Ralph Mucerino, New York, NY (US)

(73) Assignee: American International Group, Inc., New York, NY (US)

( * ) Notice: Subject to any disclaimer, the term of this patent is extended or adjusted under 35 U.S.C. 154(b) by 330 days.

(21) Appl. No.: 12/466,846

(22) Filed: May 15, 2009

(65) Prior Publication Data

US 2010/0036684 A1 Feb. 11, 2010

Related U.S. Application Data

(60) Provisional application No. 61/053,534, filed on May 15, 2008.

(51) Int. Cl.
 *G06Q 40/00* (2012.01)
(52) U.S. Cl. .......................................................... 705/4
(58) Field of Classification Search ........................ None
 See application file for complete search history.

(56) References Cited

U.S. PATENT DOCUMENTS

| | | | |
|---|---|---|---|
| 6,912,502 B1* | 6/2005 | Buddle et al. .................... 705/10 |
| 7,151,438 B1* | 12/2006 | Hall et al. ................. 340/286.06 |
| 7,571,109 B2* | 8/2009 | Fawls et al. ........................ 705/8 |
| 7,634,420 B2* | 12/2009 | Kendall et al. ..................... 705/4 |
| 2002/0042731 A1* | 4/2002 | King et al. ......................... 705/10 |
| 2002/0069090 A1* | 6/2002 | De Grosz et al. .................. 705/4 |
| 2003/0229522 A1* | 12/2003 | Thompson et al. ................ 705/4 |
| 2004/0054613 A1* | 3/2004 | Dokken ............................ 705/36 |
| 2005/0183143 A1* | 8/2005 | Anderholm et al. ............. 726/22 |
| 2005/0197952 A1* | 9/2005 | Shea et al. ........................ 705/38 |
| 2006/0047561 A1* | 3/2006 | Bolton .............................. 705/10 |
| 2006/0100912 A1* | 5/2006 | Kumar et al. ...................... 705/4 |
| 2006/0190310 A1* | 8/2006 | Gudla et al. ....................... 705/7 |
| 2006/0259316 A1* | 11/2006 | Breslin et al. ...................... 705/1 |
| 2008/0221944 A1* | 9/2008 | Kelly et al. ........................ 705/7 |
| 2009/0112634 A1* | 4/2009 | Koziol ............................... 705/4 |

FOREIGN PATENT DOCUMENTS

WO WO 2009/140592 A1 11/2009

OTHER PUBLICATIONS

Henry Teitelbaum. (Apr. 2008). Special Report Coping With Crisis—Basel Faulty. Institutional Investor 4 pages. Retrieved May 4, 2012, from ABI/INFORM Global. (Document ID: 1481469481).*
About to Change, Banks That Hold More Than That required by Legislation Should Put It to a More Useful Purpose. (Jul. 2006). The Banker,1. Retrieved May 4, 2012, from ABI/INFORM Global. (Document ID: 1085218601).*
Betty Penzner. (Mar. 2006). AFP of Indiana Spotlights Capital Accord Basel II. AFP Exchange,8,10. Retrieved May 4, 2012, from ABI/INFORM Global. (Document ID: 1007145661).*

(Continued)

*Primary Examiner* — Bruce I Ebersman
(74) *Attorney, Agent, or Firm* — Leydig, Voit & Mayer, Ltd.

(57) ABSTRACT

A method for underwriting an insurance product includes identifying a plurality of event categories of operational risk loss and drafting information requests for operational risk management components thereof. A database of the insurance company for stores and analyzes information provided by the client to yield an operational risk exposure assessment of the client.

9 Claims, 10 Drawing Sheets

OTHER PUBLICATIONS

International Searching Authority, International Search Report and Written Opinion relative to related International Application No. PCT/US2009/044138, mailed Jun. 29, 2009.

International Bureau of WIPO, International Preliminary Report on Patentability relative to related International Application No. PCT/US2009/044138, mailed Nov. 25, 2010.

* cited by examiner

METHOD AND SYSTEM OF INSURING RISK

CROSS-REFERENCE TO RELATED APPLICATIONS

This patent application claims the benefit of U.S. Provisional Patent Application No. 61/053,534, filed May 15, 2008, which is incorporated herein in its entirety by reference.

FIELD OF THE INVENTION

The invention is related to a method and system of assessing and insuring operational risk and providing a capital mitigating solution for financial institutions.

BACKGROUND OF THE INVENTION

The international banking community adopted the Bank for International Settlements (BIS) Basel II Accord as an update from the original Basel I accord written in 1975. This accord comprises recommendations on banking laws and regulations issued by the Basel II Committee on Banking Supervision. It also seeks to halt an erosion of capital standards in international banking systems. The provisions of Basel II align regulatory requirements with economic principles of risk management. This includes defining the international standards of minimum capital requirements for banks to set aside to guard against market risk, credit risk as well as operational risk.

Operational risk can be defined as the risk of loss resulting from inadequate or failed internal processes, people and systems, or from external events. This definition includes legal risk (including fines, penalties, punitive damages resulting from supervisory actions and private settlements) but excludes strategic and reputational risk. Operational risk events are separated into seven categories: 1) internal fraud; 2) external fraud; 3) employment practices and workplace safety; 4) clients, products and business practices; 5) damage to physical assets; 6) business disruption and system failures; and 7) execution, delivery & process management. Traditionally, banks and other financial institutions assessed their own operational risk in each category and calculate the capital reserve needed to cover any operational risk.

Recent regulations prescribe various standards for operational risk management for banks and similar financial institutions and give guidance for the Capital calculation for operational risk as well as requiring banks to develop internal systems to assess operational risk. The regulations allow some banks using the Advanced Measurement Approach (AMA) method of capital calculation for operational risk the flexibility to drop below the minimum requirements of capital-to-risk-weighted asset levels if they are able to meet certain requirements set forth by the Basel II regulation. Under the June 2006 Basel II Revised International Capital Framework, available at http://www.bis.org/publ/bcbsca.htm and incorporated herein in its entirety by reference, a financial institution must hold capital against operational risks. The bank may obtain a reduction of up to 20% of identified regulatory capital if it can adequately demonstrate the transfer of risk. Redeployment of the capital reduced may be conducted at the discretion of the bank. Accordingly, a financial institution in such circumstance can invest up to 20% of their operational risk capital instead of holding it in reserve. In addition, this regulation presents an opportunity for insurance companies to offer new operational risk insurance products to provide such capital relief to financial institution clients.

BRIEF SUMMARY OF THE INVENTION

A method for underwriting an insurance product provided by an insurance company is directed to insuring assets, the retention of which is governed by legislation, against operational risk of a client controlling the assets and engaged in transacting business in an industry. The method includes identifying a plurality of event categories of operational risk loss based on pertinent legislative regulations of the industry, and creating a table in electronic form by use of a computer operating a word processing and a spreadsheet program. At least one operational risk management component is identified for each of the seven event categories. At least one information request is drafted for each of the operational risk management components, and a checklist is created in electronic form by use of a computer operating the word processing and the spreadsheet program that includes at least one information request. The table and checklist are transferred from the servers of the insurance company to servers of the client. A database infrastructure is created on the servers of the insurance company for storing and analyzing information provided by the client. The database infrastructure is populated with client information provided by the client in response to at least one information request, and the client information is analyzed by retrieving portions thereof from the database infrastructure. Such portions of the client information are analyzed using word processing and spreadsheet software applications operating on the servers of the insurance company. Based on such analysis, an operational risk exposure assessment of the client is determined based on the client information stored in the database infrastructure.

DETAILED DESCRIPTION OF THE INVENTION

Figure 1:
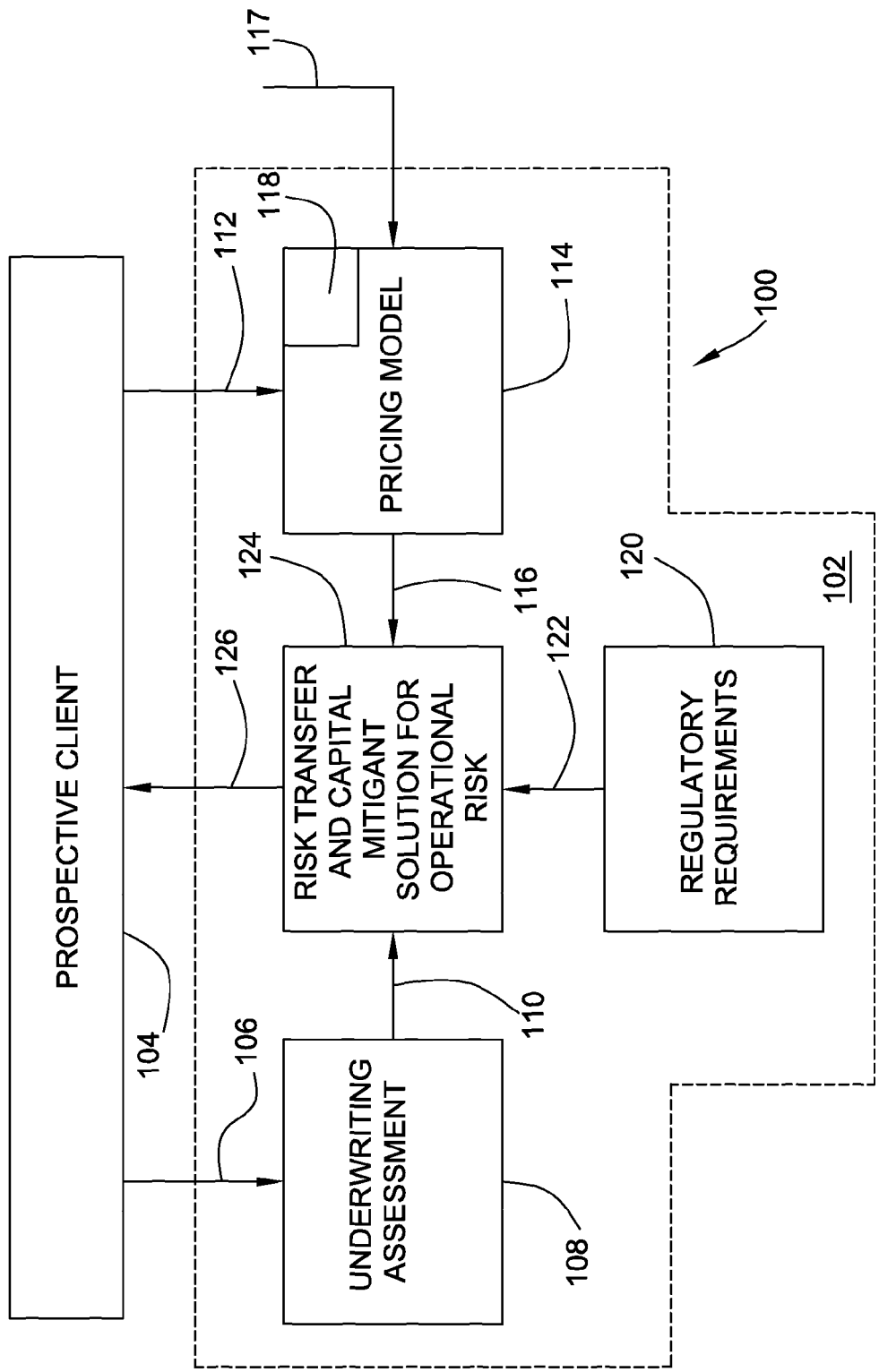
FIG. 1 is a block diagram of an underwriting framework in accordance with the disclosure.

Before offering any type of product, insurance companies must possess infrastructure and processes used to determine and provide appropriate insurance coverage to prospective customers. The present disclosure provides an underwriting framework for use with a policy template that can be adjusted based on specific customer requirements and that is aligned with seven operational risk events that are identified and that coincide with those included in the Basel II regulatory requirements. One can appreciate that the systems and methods disclosed herein are equally applicable to other or similar types of regulatory requirements in addition to Basel II.

The underwriting framework disclosed herein further includes a payment protocol for claims and a pricing model infrastructure for operational risk insurance. In one embodiment, the disclosed underwriting infrastructure may be useful in assessing the operational risk exposure of a bank or other financial institution, provide an insurance policy that is tailored to the needs of a particular bank organization, and provide a method for accurately quoting a price for an insurance policy. The term "bank" as used herein should be broadly construed to mean any financial institution; and especially those institutions whose retained capital amount is governed by laws, rules or regulations, to offset credit and operational risks.

The underwriting framework disclosed herein provides the infrastructure and process for an insurance company to identify and assess key operational risk exposures and the general risk profile of a bank based on information provided by the bank. Such bank information is evaluated based on intrinsic factors as well as extrinsic factors, for example, compiled market statistical information from other banks that reside in a central database or informational depository and exchange. The disclosed framework includes an operational risk assessment performed using two different approaches for improved reliability and accuracy. The first approach assesses regulatory requirements to ensure compliance therewith, and the second approach maps the maturity of an organization in terms of a finite collection of indicators, as is discussed in further detail below. The results from the two approaches may be combined and/or compared to yield the most reasonable solution that meets the needs of the client. The disclosed framework further includes a section enveloping general underwriting considerations section.

Each part or section includes requests for information, which can provide the data necessary to complete the evaluation of an organization based on each approach. These information requests can be made in writing, for example, in the form of a questionnaire sent to an organizations, or can alternatively be made orally during interviews between insurance representatives and potential clients. Data and feedback received in response to the information requests can be used as a basis or as inputs to policy pricing models as well as in the underwriting process. Aggregation and analysis of this information, can provide an insurance company with the ability to assess the operational risk and capital requirements of a prospective client, identify and calculate the risk of loss from banks and capital benefit, determine the appropriate premiums for a policy, and amend the policy template to effectively underwrite the operational risks of a bank or other financial institution.

In one embodiment, a policy template is used to provide a short and concise recitation of the terms of the policy. The policy template serves as a basis for an individual operational risk insurance policy for a particular client bank to be efficiently delivered after its operational risks are assessed. This new product maps existing products to insurable aspects of operational risk into the language of the Basel II operational risk events which helps facilitate the capital relief process for banks to be compliant with Basel II regulatory requirements. The policy may also provide excess coverage against catastrophic events insofar as funds or other assets of a financial institution are subject to insurable claims. In one embodiment, the policy template may be used as a starting point in the evaluation, evolution, and negotiation of the policy, and may be modified to suit the specific needs or address any special risks associated with the client bank. Any such special circumstances may advantageously be accounted for in the premium of the insurance product using the pricing models, which can allow insurance companies to efficiently quote a price for an insurance coverage for a particular client bank after assessing their operational risk and the value of capital relief benefit to client from using this solution.

A specific embodiment is disclosed in reference to the figures and the description below. More specifically, a block diagram of one embodiment for an underwriting framework 100 is provided in FIG. 1. The underwriting framework 100 illustrates the main components or modules of information collection and processing that provide the interaction between an insurance company 102 and a prospective client 104. More specifically, the prospective client 104 provides organizational information 106 to the insurance company 102, for example, in response to specific information requests as discussed above. The organizational information 106 is provided to an underwriting assessment module 108 within the insurance company 102.

The underwriting assessment module 108 may include personnel, for example, analysts, and/or appropriate software applications operating on computer servers of the insurance company 102 that are arranged to collect, categorize, analyze, and evaluate the organizational information 106. The underwriting assessment module 108 provides an assessment of operational risk exposure 110, which is based on metrics that flow from the regulatory compliance that is required, for example, the metrics included in Based II. The assessment of operational risk exposure 110 is further based on a unique or tailored maturing profile of a client relative to industry benchmarks. In one embodiment, the operational risk exposure 110 can be further based on traditional underwriting considerations that are used to assess the general risk profile of a prospective client in a specific industry.

In a similar fashion, operational risk loss information 112 provided by the prospective client 104 is input in a pricing model 114 of the insurance company 102. The operational risk information 112 may include aggregated or individual loss events that have been experienced by the prospective client 104 within a finite preceding period, as well as the financial repercussions of such losses, expressed in an aggregate or individual form. For example, losses due to fraud in the operating branch of a bank may result in a net loss to the bank.

Such information is collected and processed in the pricing model 114, which may include specialized personnel, dedicated computational resources, databases, and other devices that can quantify the operational risk of a prospective client and provide a policy pricing estimate 116. The policy pricing estimate 116 is based on detailed operational risk loss information collected from a bank or other prospective client to calculate expected loss ratios and set base policy pricing. The policy pricing estimate 116 may further include an assessment of capital relief benefit to the client 104, which is incorporated into the pricing.

In one embodiment, the operational risk information 112 collected from multiple prospective clients and other industry entities 117 is used to develop a benchmark 118 for an industry, which includes a database encompassing all information available for the industry. The benchmark 118, when comprehensively aggregated and matured, can quickly and accurately provide an alternative market price index for operational risk. One can appreciate that the benchmark 118 essentially is a database of industry relevant information that can reside in a server or other information collection and processing device owned by the insurance company 102, whose security against unauthorized access may be reliably maintained due to the confidential nature of the information stored therein.

A third component of the underwriting framework 100 are the regulatory requirements 120, which are schematically shown as a block that represents one or more bodies of laws or regulations that apply to the prospective client 104. The insurance company 102, through the aid of legal counsel or other specialized input, may analyze the regulatory requirements 120 and provide a regulatory assessment 122 indicative of the operational risk events identified in the regulations as well as, in one embodiment, event driven language used in a policy to facilitate easy mapping of risk exposures to use product for risk transfer and a capital mitigant solution.

The operational risk exposure 100, policy pricing estimate 116, and regulatory assessment 122 are used to provide a risk transfer and capital mitigant solution for operational risk module 124. The risk transfer and capital mitigant solution for operational risk module 124 may include a collection of interrelated devices that analyze and combine the information provided thereto into a policy proposal 126 provided back to the prospective client 104. The policy proposal 126 advantageously accounts for the major aspects of a policy, which include the organizational and operating risks, pricing, and regulatory requirements. One can appreciate that the policy proposal 126 may be the culmination of numerous analyses or iterations of policy solutions, which can be conducted by automated, modeling software solutions executed on servers or other computational devices. Such iterations or other equivalent processes may be conducted until an optimum solution is found and provided to the prospective client 104 in the form of the policy proposal 126.

Figure 2:
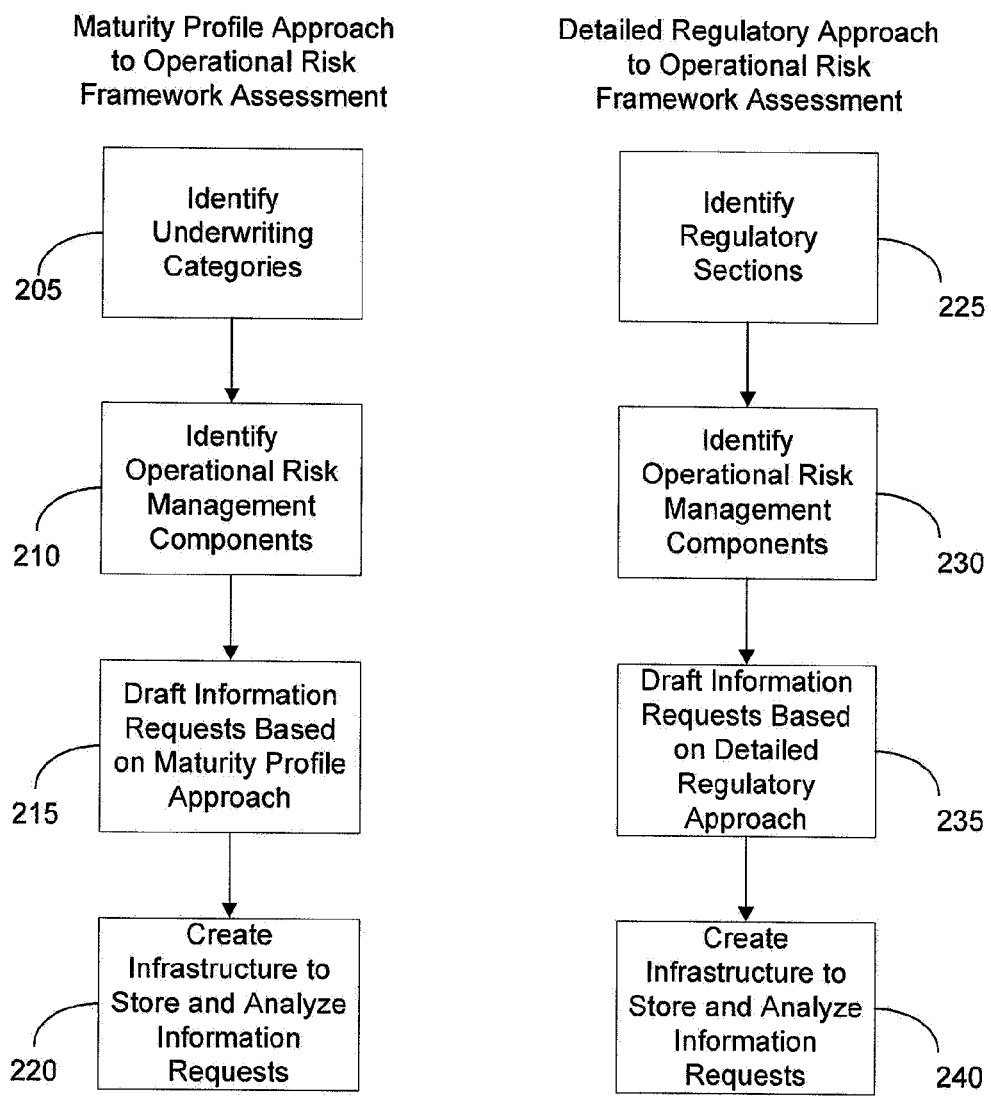
FIG. 2 is a flow diagram illustrating two exemplary approaches to an underwriting framework.

Two flowcharts illustrating two approaches to an underwriting framework, for example, the underwriting framework 100 illustrated in FIG. 1, are shown in FIG. 2. In one embodiment, the underwriting framework assesses the operational risk attached to each individual bank or prospective client. In a first approach, illustrated on the left side of FIG. 2, a maturity profile of a bank is evaluated. The first approach may be implemented, for example, within the underwriting assessment module 108 shown in FIG. 1. A second approach is illustrated on the right side of FIG. 2 and includes a detailed regulatory approach to operating risk. The second approach may be implemented, for example, within the regulatory requirements module 120 shown in FIG. 1.

The first approach includes an identification of underwriting categories at 205. Such underwriting categories may include underwriting for transactional assets, trading assets and capital, private and corporate loan obligations, and other types of assets. Operational risk management components associated with each of the underwriting categories are identified at 210. The risk management components in 210 associated with each of the underwriting categories identified at 205 may be retrieved from a database that is stored in electronic form onto a server or other computational device of the insurance company based on an input indicative of the underwriting categories that have been identified. In one embodiment, management components may include various aspects of organizational operation and behavior.

An exemplary collection of risk management components is presented in Table 1 under the heading "Maturity Profile Mapping." The major areas or categories of organizational risk management (ORM) used in the present disclosure appear under the heading "ORM Assessment Categories." Finally, regulatory requirements corresponding to each ORM assessment category appear under the heading "Regulatory Requirements Assessment."

TABLE 1

Operational Risk Assessment

| ORM Assessment Categories | Regulatory Requirements Assessment | Maturity Profile Mapping |
|---|---|---|
| Governance | Application Business Continuity Management Employees and agents Internal Control Records Risk Assessment | Risk Organization, Governance and Efficiency |
| Identification & Assessment | Business Strategy Risk Control | Risk Identification, Scenario Analysis & Stress Testing, Risk Controls including Limit Setting |
| Monitoring & Reporting Quantification | MI Records Application Business Lines Definitions Methodology and systems Purpose Restrictions | Risk Monitoring and MI Risk & Finance Analytics Data & IT Infrastructure Risk Aggregation Risk Modeling |
| Risk Appetite & Policy | Remuneration policies | Risk Strategy & Appetite Policies, Standards, People & Culture |
| Use Test | Systems and Controls | Capital Planning & Management, Risk-adjusted Performance Measurement Active Portfolio Management Risk-based Pricing and Decision Making |

Table 1 shows a summary of the operational risk assessment framework. This tool includes two approaches that allow the insurance company to assess a bank's operational risk framework. Each approach is based on the same six framework categories that are aligned to a typical bank's operational risk management framework which are: 1) Governance; 2) Identification and Assessment; 3) Monitoring and Reporting; 4) Operational Risk Quantification; 5) Risk Appetite and Policy; and 6) Use Test (level in which organizational risk is embedded into the business).

The regulatory requirements assessment approach contains a list of regulation and interpretations of the Basel II operational risk standards promulgated by the home country government agency organized into regulation subsections and placed into the six framework categories. The insurance company uses the regulatory requirements assessment to identify key risks and check that sufficient controls are in place to mitigate such operational risks as well as compliance with current Basel II regulations.

The maturity profile mapping approach incorporates a list of broad components within the six framework categories used to assess the management of operational risks in a client bank based on its maturity or responsibility towards operational risk. Each operational risk, for example, Governance, may require more than one requirement to be met by the organization of the client.

Returning now to FIG. 2, information requests are drafted at 215 based on the identified operational risk management components. Such information requests may include queries for current and past performance of an organization in one or more categories, such as governance, issue identification and assessment procedures, monitoring and reporting processes, quantification metrics for evaluating risk of loss, the organization's risk appetite and policy, the tests and procedures followed for investment decisions, and others. The information requests may be compiled in tangible or electronic form in tables, which are created and stored on servers of the insurance company using word processing and/or spreadsheet programs, and may be transmitted or otherwise sent to the client for storage on servers of the client. Infrastructure components, which includes servers, software applications, and databases are created and installed to store and analyze the information requests based on the maturity profile approach at 220.

An alternative or supplementary approach to an underwriting framework that assesses operational risk based on a detailed regulatory approach includes identification of regulatory sections per country that may be used to accurately assess a client bank's operational risk at 225. Operational risk management components corresponding to the identified regulations or sections thereof are identified at 230. Exemplary regulatory sections and exemplary operational risk management components appear in the middle column of Table 1 above.

Information requests are drafted based on the operational risk management components identified at 235. Each operational risk management component identified may require more than one information request. Table 2 below shows an exemplary collection of information requests that may be required for an accumulation of appropriate information relative to the effectiveness of governance in an organization.

TABLE 2

| Operational risk framework section | Reg. | Desc. | Rating (Rule/ Guidance) | Interpretation and guidance |
|---|---|---|---|---|
| Governance | Internal Control (SYSC, 3.1.1) | Systems and controls adequate for the business must be maintained | R | In the FSA handbook, OR is covered in Chapter 6 of the Prudential Sourcebook for Banks, Building Societies and Investment Firms (BIPRU) and in Senior Management Arrangements, Systems and Controls (SYSC). In the context of SYSC 3.1.1, a firm must be able to demonstrate that it has a robust internal control environment |

Table 2 includes one example of the regulatory requirements assessment approach regarding the Governance operational risk framework category. The regulation sections are mapped to operational risk management categories and provide description of each requirement as well as interpretation and guidance. The regulations are very detailed and try to capture every aspect of a client bank's operational risk. One can appreciate that other operational risk management components as they appear in the left most column of Table 1 may correspond to additional sources of information being required.

When drafting information requests, pertinent information may be categorized and a checklist may be created to track the progress of obtaining all relevant information before proceeding with the assessment. An exemplary checklist including specific documents or reports for which requests may be submitted for each operational risk management component is shown in Table 3. It is noted that the operational management risk of Governance is used in the illustration below for consistency.

TABLE 3

|  | DOCUMENTATION | RECEIVED | Reviewed |
|---|---|---|---|
| Governance | Organization chart/Committee Structure/Policy/ Roles and responsibilities/ Purpose, Structure, Vision/Stakeholders for the following functions: | Y/N | Y/N |

TABLE 3-continued

| DOCUMENTATION | RECEIVED | Reviewed |
|---|---|---|
| Group Risk Committee Details of oversight committee including charter and composition (covered above) | Y/N | Y/N |
| Operational Risk | Y/N | Y/N |
| Compliance | Y/N | Y/N |
| Internal Audit | Y/N | Y/N |
| Sarbanes Oxley | Y/N | Y/N |
| Financial Control (due diligence committee) | Y/N | Y/N |
| AML/Financial Crime/Fraud | Y/N | Y/N |
| Financial Risk | Y/N | Y/N |
| Business Continuity | Y/N | Y/N |
| Other relevant groups/teams/committees | Y/N | Y/N |
| Minutes any of the above (and other) risk committee meetings held for the past year | Y/N | Y/N |
| Committee structures, people and delegated authorities) | Y/N | Y/N |
| Outline of Group Risk Management Framework to include details of functions included and their positions within the framework | Y/N | Y/N |
| Documentation of Group Risk Management Framework | Y/N | Y/N |
| Provide details of the UK Corporate Governance framework within [Client] | Y/N | Y/N |

Table 3 shows exemplary information requests for the regulatory requirements approach regarding the governance operational risk category. Information requests are drafted as part of the infrastructure aspect of the disclosure using word processing and document handling software applications and stored in one or more databases. An insurance company can efficiently distribute the information requests electronically to client banks. The information requests include requesting a client bank to provide documentation pertaining to different operational risk components. The information requests for the regulatory approach includes requests for documents pertaining not only to organization charts, committee structures, documentation risk management framework and operational risk policy, but also Sarbanes Oxley, Internal Audit, Compliance, Business Continuity, Financial risk and other listed sets of documents. For example, to assess the operational risk due to governance, an insurance company requests documentation pertaining to the organization structure, corporate committee structure, and management turnover (business continuity). This approach provides an objective assessment of a client bank's operational risk because it analyzes a client bank's compliance to the government regulations.

When adequate information has been collected via responses sent to the information requests, infrastructure including servers, software applications, and a filtered database of insurable components of operational risks are created and arranged to store and analyze the information requests based on the detailed regulatory approach at 240.

Regardless of the approach used, most operational risk assessments will require basic information indicative of the history and the particular characteristics of each prospective client. Table 4 provides details regarding an exemplary information request from the regulatory assessment for operational risks and loss data. The historical and forward looking loss event data, operational risk scenarios, and details outlined in this table as part of the operational risk framework requirement are components combining to provide an exemplary operational risk insurance solution. The information from this request may be used by the insurance company to tailor and finalize the policy for the client bank as well as provide the underlying data supporting future alternative risk transfer market price indices for operational risk.

TABLE 4

| Category | | Documentation |
|---|---|---|
| Operational Risks and Loss Data | Scenario | Risk Scenario Assessments Sample operational risk assessments from Business and Support lines |
| | Heat map | Op-risk Heat map 6 × 6 Risk matrix |
| | Risk Library | Library of Risks - breakdown of Risk across the business functions Details of Key Risk Indicators ("KRI") analysis and reporting Risk categories Key Risk Indicators Analysis of changing loss and risk profiles and establishment of any KRIs Breaches list Issue Track Report (Weekly) |
| | Loss Event Data | Loss History/Loss Event Data Top 10 losses for current year Top 10 losses for previous year Top 15 losses historically |

Using the detailed regulatory requirements approach, an insurance company assesses the operational risk of a client bank by analyzing the responses to the information requests using software applications (e.g. spreadsheet computer programs) and determines the extent of compliance of the client bank is with government regulations. Based on this analysis, the insurance company assigns a rating for each of the operational risk framework categories in order to assess the client bank's operational risk and benchmark against their peer group.

For further illustration, Table 5 shows exemplary evaluation assessment criteria for the maturity profile mapping approach regarding the Governance operational risk framework category. This assessment assigns a maturity rating for each operational risk framework category for the client. Based on the responses to information requests for the maturity profile approach, an insurance company may assess a client bank's maturity in managing operational risk. For example, an insurance company may give an assessment rating that categorizes a client's banks maturity into three levels: Basic, Average, or Industry Leading.

For example, a "Basic" assessment is given when a client bank documents its governance framework with key committees established and minutes of meetings maintained. However, whether the client bank fully addresses conflicts between the bank's legal entity and its management structure is evaluated. An "Average" assessment is given when a client bank documents its governance framework and its committees are viewed as effective and value adding to the business. However, large complex issues can occasionally highlight additional conflicts in ownership and responsibility. An "Industry Leading" assessment is given when a client bank documents its governance framework and its committees are viewed as effective and value adding to the business. In addition, conflicts have been identified and explicitly addressed for "Industry Leading" assessments. The rating system used is provided in Table 5 below. Other categories will have corresponding rating systems that are used by the insurance company in compiling an overall picture of the maturity of the client bank.

TABLE 5

| ORM Cat. | Eval. Criteria | Basic | Average | Industry Leading |
|---|---|---|---|---|
| Governance | Organization (Effectiveness of governance arrangements and level of cascade) | Documented governance framework, with key committees established, and minutes of meetings maintained. May not fully address conflicts between legal entity and management structure | Documented governance framework. Committees are viewed as effective and value adding by the business. Large complex issues can occasionally highlight additional conflicts in ownership and responsibility | Documented governance framework. Committees are viewed as effective and value adding by the business. Conflicts have been identified and explicitly addressed |

Table 6 provides details pertaining to an exemplary information request for the maturity profile mapping approach. The information requests for the maturity profile approach seek sets of documents, namely organization charts, committee structures, client bank's risk management framework, and operational risk policy. The data in Tables 5-6 are analyzed by insurance underwriters using software applications such as spreadsheet programs.

TABLE 6

|  | DOCUMENTATION | RECEIVED |
|---|---|---|
| Governance | Organisation chart | Y/N |
|  | Committee Structure | Y/N |
|  | Documentation Risk Management Framework | Y/N |
|  | Operational Risk Policy | Y/N |

In addition to the selected risk categories, traditional risk categories are called upon in the evaluation of a client bank as part of the underwriting framework. Table 7 shows a summary of key risk areas under the traditional underwriting considerations section of the underwriting framework. When underwriting any financial institution, the insurance company researches, interviews, and requests documentation from the client bank to conduct a traditional underwriting assessment. Information gathered such as prior claims data, investment banking transactions, lending activity, capital requirements and governance drive the amendments to the policy template as well as the pricing model.

TABLE 7

| Key Risk Area |
|---|
| Business Activity |
| Governance |
| Investment banking |
| Treasury/Trading |
| Audit |
| Distribution |
| Regulatory compliance |
| Fund Management |
| Private Clients/Banking |
| Information Technology |
| Lending |
| Operational Risk |

TABLE 7-continued

| Key Risk Area |
|---|
| Financial Crime |
| Product approval |
| Outsourcing |
| Cross-border electronic banking |
| Claims history |

As with the other risk categories, information requests are drafted to provide client information useful in evaluating the operating risk of a client bank against the traditional risk categories. Table 8 provides details pertaining to an exemplary information request for traditional underwriting considerations. For example, when evaluating risk exposure in the treasury or trading risk areas, an underwriter will require information regarding the client bank's treasury operations and whether there are proper structures, controls and procedures in place, the levels of risk tolerance, third party derivative contracts, trading activity as well as exposure management and audit recommendations, all of which may be used to help assess the client's traditional risks.

TABLE 8

Traditional Underwriting Considerations

| Key Risk Area | Underwriting Considerations |
|---|---|
| Governance | Board composition |
| | Regulatory compliance |
| | Exposure to shareholder claims |
| | Credit Rating |
| | Employment practices |
| | Corporate communications |
| | Financial analysis |
| Investment banking | revenue breakdown |
| | transaction history |
| | controls and procedures |
| | claim history |
| Treasury/Trading | structure, controls and procedures |
| | authority levels and enforcement |
| | risk tolerance |
| | third party derivatives trading |
| | exposure management |
| | reporting structures |
| | regulatory reporting |
| | audit recommendations |
| Audit | audit cycle, process, reporting, monitoring, follow-up |
| | department structure |
| | staff turnover, recruitment, qualifications, training |
| | systems and methodologies |
| | areas for weakness |

Figure 3:
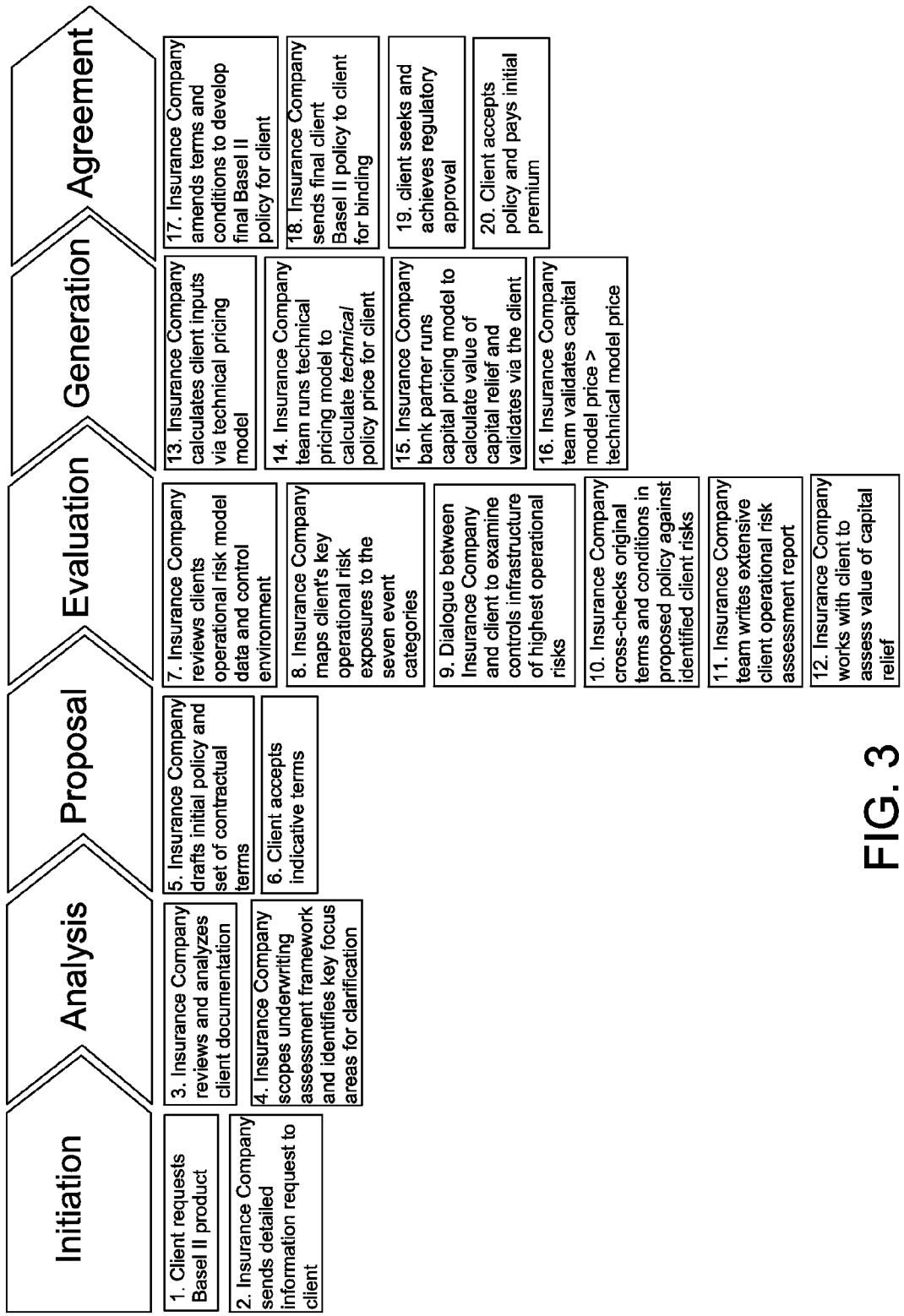
FIG. 3 is a flow diagram for a process of implementing one aspect of a method insuring operational risk in accordance with the disclosure.
Figure 4:
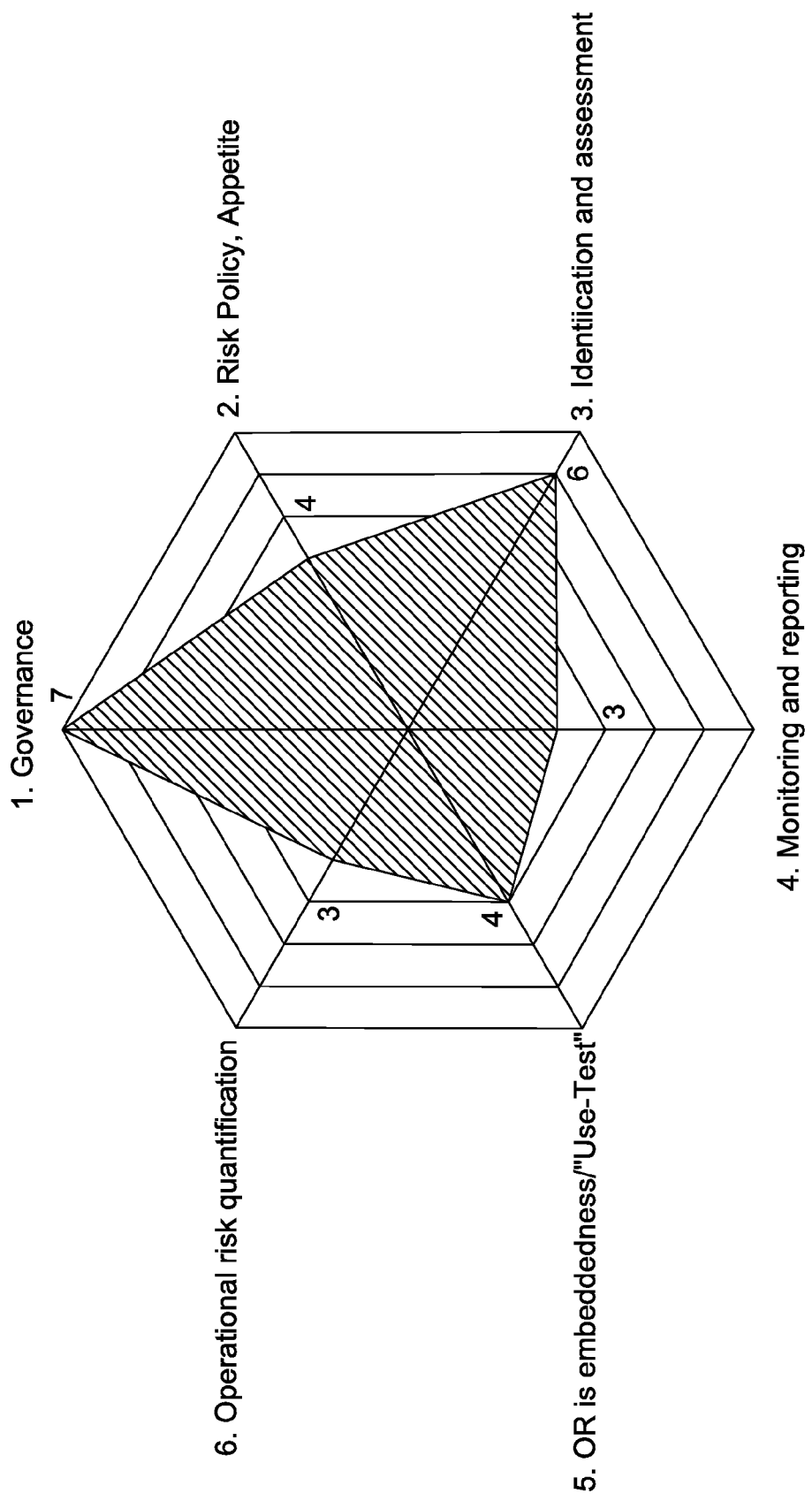
FIGS. 4-7 show graphical data with respect to one exemplary underwriting framework.

Having described the underwriting framework in detail, a flow chart for an exemplary process that may be followed when dealing with a prospective client is shown in the block diagram of FIG. 3. The illustrated process is broken into procedural steps that are categorized under 6 different phases of a project. The exemplary process shown in FIG. 3 includes six stages: 1) Initiation; 2) Analysis; 3) Proposal; 4) Evaluation; 5) Generation; and 6) Agreement.

Beginning with the Initiation stage, the process begins at step 1 with a request from a client for operational risk insurance coverage from an insurance company. At a step 2, the insurance company sends detailed information requests to the client bank. This includes requests for regulatory documentation for operational risk framework assessment, operational risk loss event data, and information from the traditional underwriting checklist.

In the second stage, the Analysis stage, the insurance company reviews and analyzes client documentation at step 3. Such review and analysis includes conducting a thorough qualitative and quantitative assessment of the client information provided. At step 4, the insurance company scopes the underwriting assessment framework and identifies key focus areas for clarification. This includes calculating client bank's expected loss ratio and validating the insurance company's capital requirements. Software applications such as spreadsheet programs are used to perform the analysis.

During the Proposal stage, an insurance company adjusts the operational risk policy template to reflect the special requirements of an individual client, and sets contractual terms and conditions at step 5. This includes the limit structure, attachment point, a checklist for exclusions and coverage, and a protocol for payment of claims. At step 6, the client bank accepts the preliminary or indicative terms of the policy and, depending on prior arrangements, pays a fee for a thorough risk management review.

The Evaluation stage depicted in FIG. 3 is the most complex of part of the exemplary process. At step 7, an underwriting team reviews the client bank's operational risk model data and control environment. At step 8, an insurance company maps client's key operational risk exposures to the seven Basel II event categories. At step 9, there is a dialogue between the insurance company and the client bank to examine controls infrastructure of highest operational risks. In other words, the insurance company addresses outstanding issues and questions from the underwriting assessment framework with the client bank. At step 10, the insurance company cross-checks original terms and conditions in proposed policy against identified risks. This includes changing the template policy terms and conditions as needed.

It is noted that the insurance company may give recommendations to client to change business policies. For example, if the governance of the client bank does not include an independent committee to oversee the bank operations, then the insurance company may recommend to the client bank establishment of an independent oversight committee to monitor the bank's business practices. At step 11, the insurance company writes an extensive client operational risk assessment report. This includes determining the maturity profile of the client bank and benchmarking the maturity profile of the client bank to its peers in the industry. At step 12, the insurance company works with client to assess the value of capital relief. This includes using statistical and scenario analysis to determine how much capital client needs to hold against the operational risks that have been identified.

During the Generation stage, the insurance company calculates client inputs via the technical pricing model, for example, the pricing model 114 shown in FIG. 1, at step 13. This includes calculating the client's expected loss ratio and fitted risk level and validating the insurance company's capital requirements. At step 14, the insurance company executes a technical pricing model to calculate the technical policy price for client. Bank data is used to develop a new alternative risk transfer market pricing index for operational risk. At step 15, the insurance company and bank partner runs or executes the capital pricing model to calculate the cost of risk and the value of capital relief. The cost of risk and value of capital relief thus calculated are validated with the client bank based on the client's key risk indicators and client's cost of capital. This step further ensures that the economic value proposition is met for the client and the market price for the policy is calculated. At step 16, a verification is made to ensure that the insurance company technical price and insurance company's cost of capital does not exceed the economic capital relief value proposition as calculated for the client because the quoted price must meet specific minimum pricing for risk and capital allocation returns.

During the Agreement stage, the insurance company amends the terms and conditions to develop a final operational risk policy for the client at step 17. All policy terms are finalized including the attachment point, policy limit, cost, exclusions and final claims payment protocol. At step 18, the insurance company sends the final client operational risk (e.g. Basel II) policy to client for binding. At step 19, client seeks and achieves regulatory approval. During this step, the client bank presents the final operational risk policy to local regulators for approval to use solution for capital relief. At step 20, client accepts policy and pays initial fee.

Figure 5:
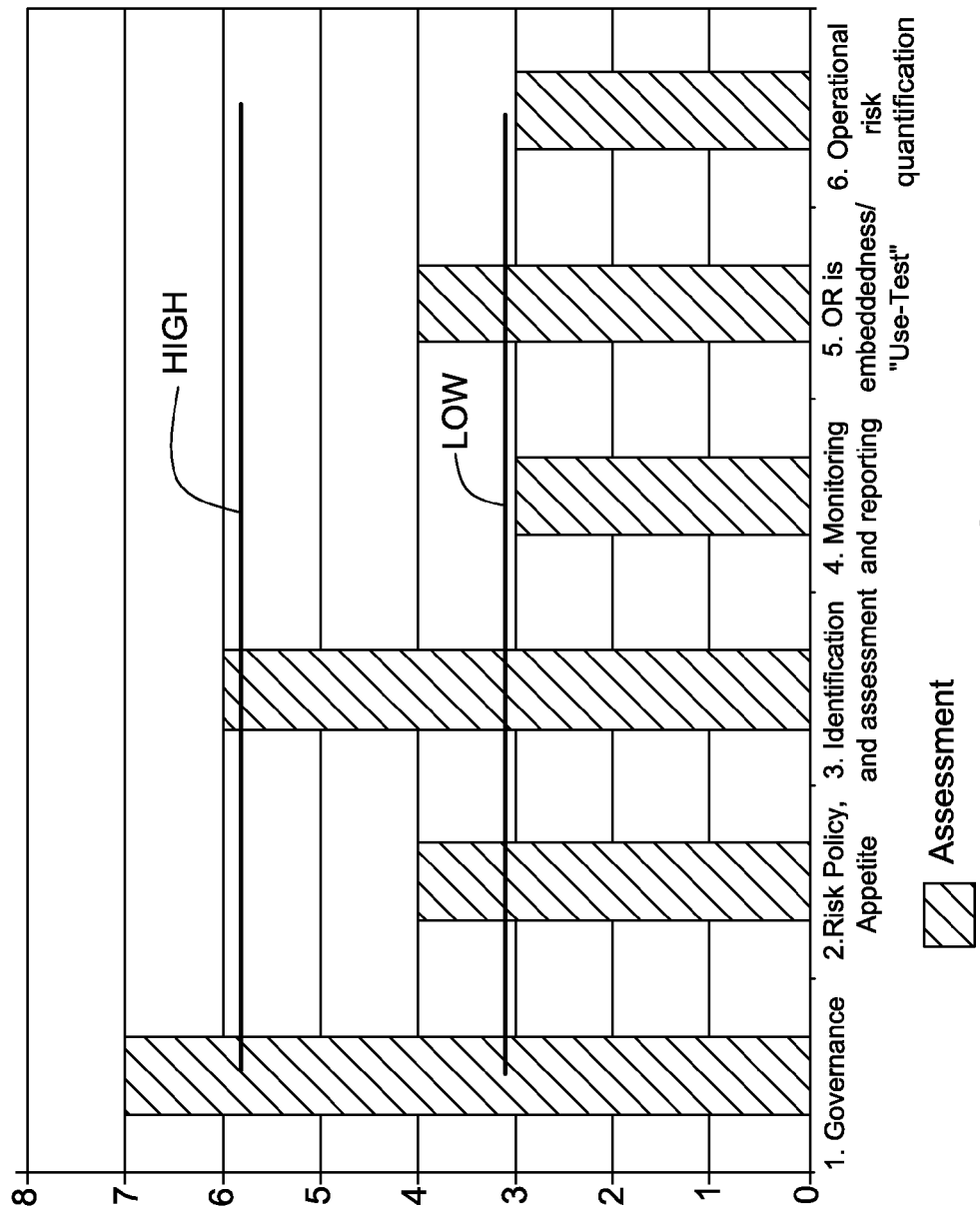
Figure 6:
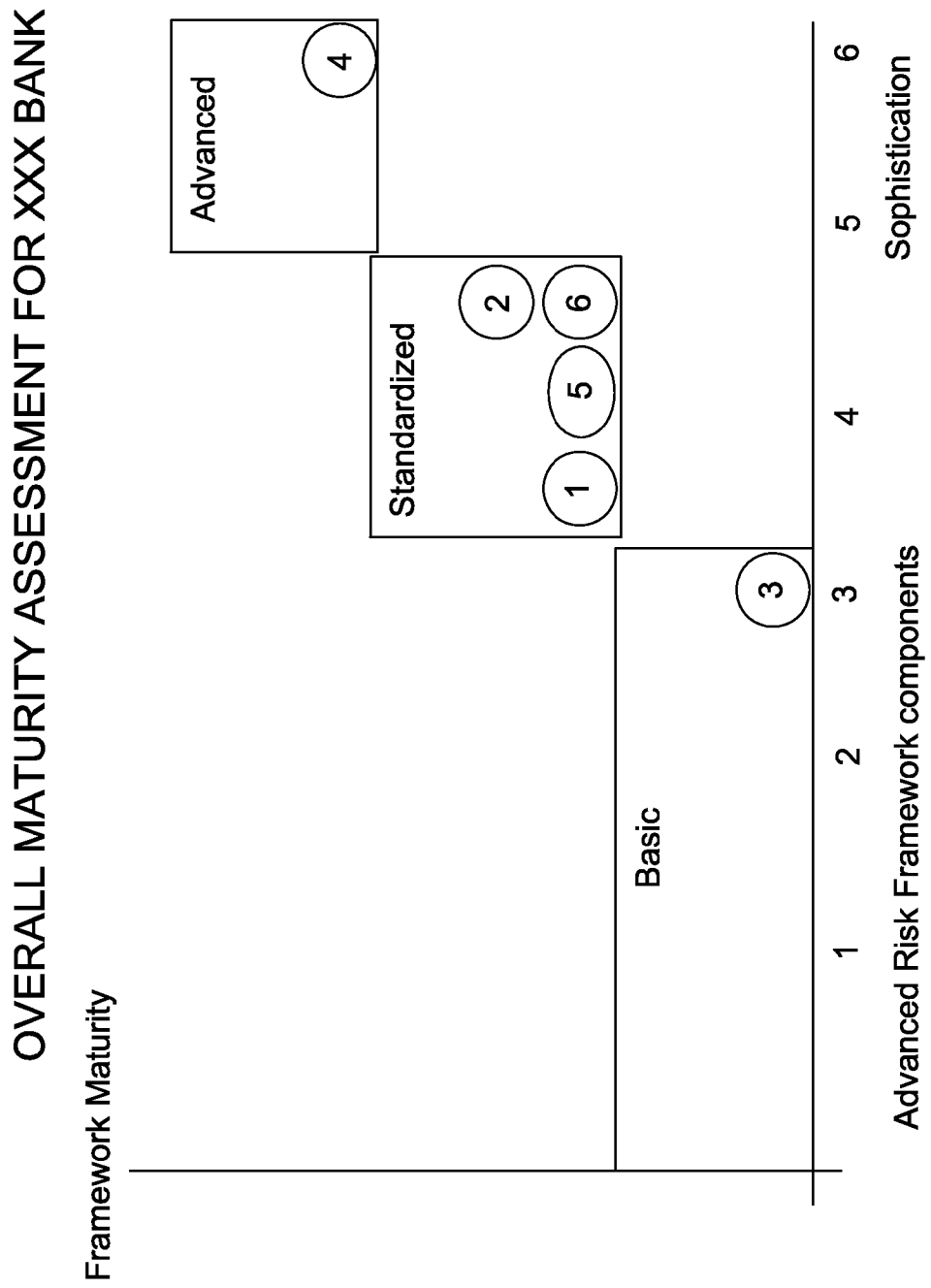

FIGS. 4-7 provide exemplary graphical illustrations of how operational risk may be quantified and/or better understood using the disclosed underwriting framework. FIG. 6 is a plot of the Operational Risk Management (ORM) assessment categories for the maturity profile approach within the underwriting framework. The maturity profile approach rates each category from a scale of 1 to 7. In the example shown in FIG. 6, a client bank's governance has rating equal to 7 while the risk policy, appetite category has a rating equal to 4. Each category is rated and plotted. The plotted area may be calculated and compared to an industry benchmark to assist in assessing the operational risk of the client bank.

Figure 7:
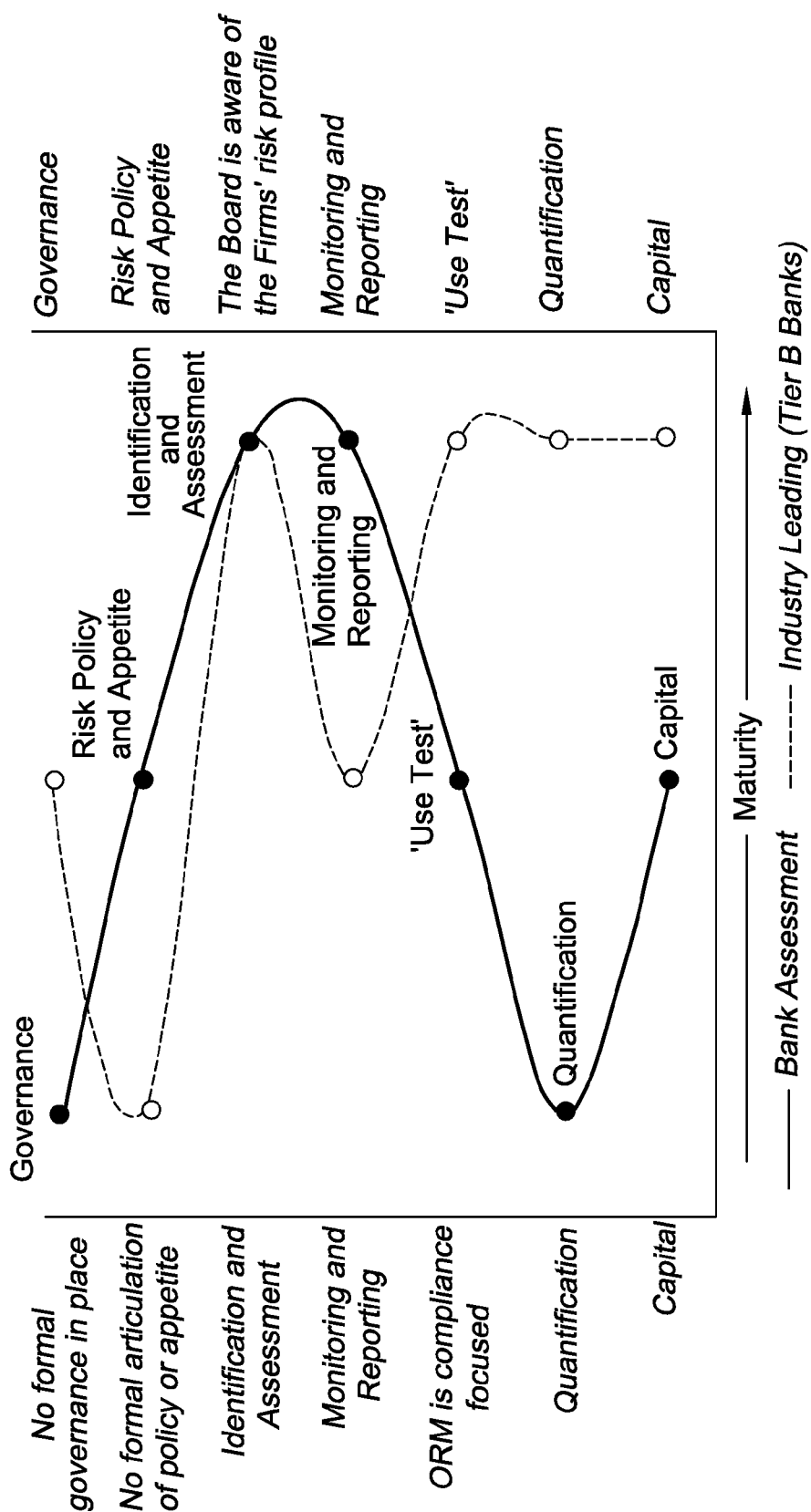

FIG. 5 is a bar graph depicting the risk for each ORM assessment category. FIG. 6 is graph of the maturity of a client bank with respect to each of the seven ORM assessment categories. Each category is compared to industry standards and rated as being Basic, Standard, or Advanced in its maturity. FIG. 7 is also a graph of each ORM assessment category for client bank. Each category is compared to the maturity of an industry leading banks to assess its operational risk.

Figure 8:
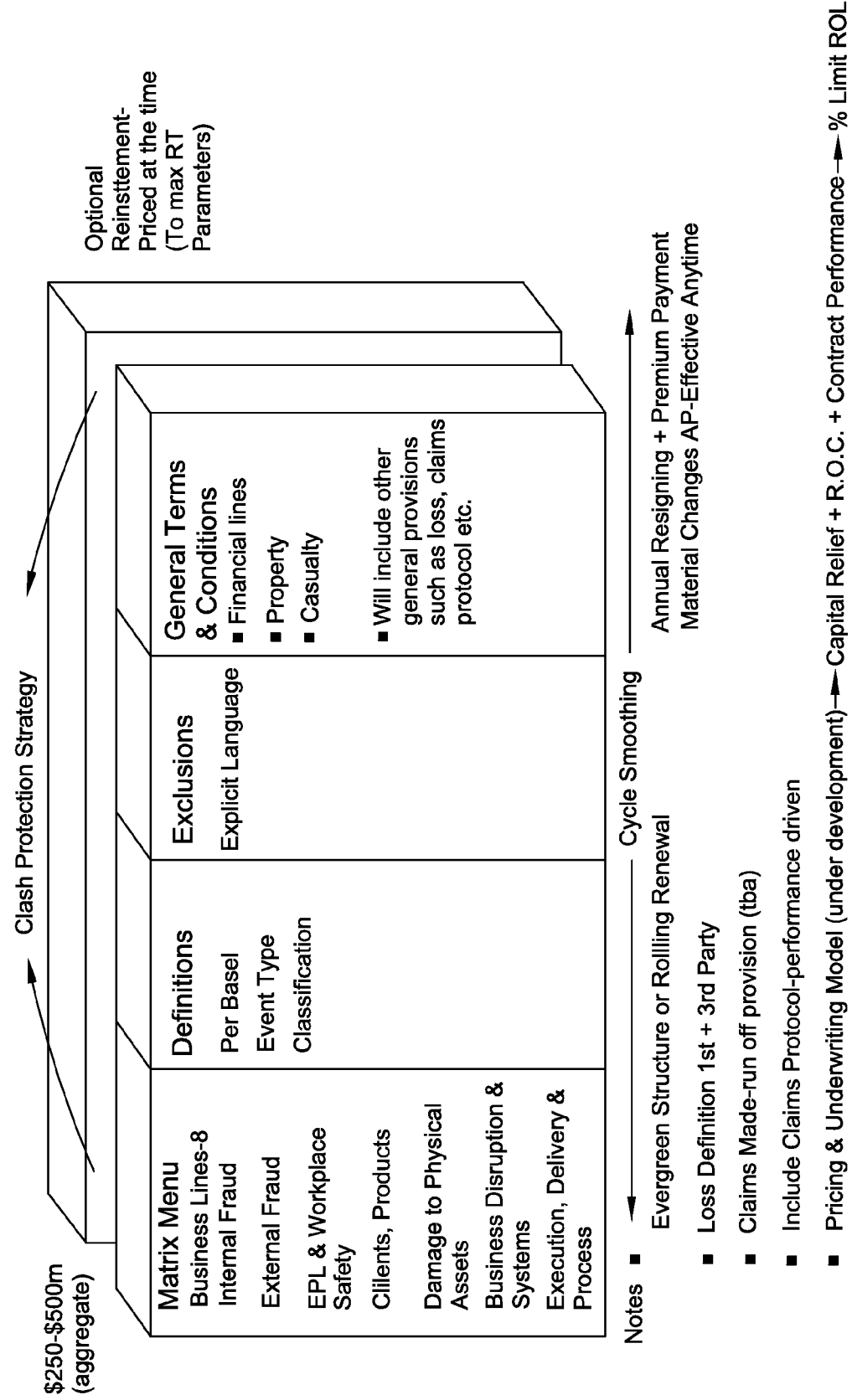
FIG. 8 is a block diagram illustrating a complementing relation between a traditional insurance product and an insurance product directed to operational risk in accordance with the disclosure.

FIG. 8 illustrates an exemplary structure of the new operational risk solution. FIG. 8 also illustrates the Clash Protection Strategy between the traditional insurance policy and the complementary operational risk insurance coverage such that the two policies do not contradict one another. For example, the operational risk insurance policy defines the seven event loss types. Its term definitions are precise and according to regulations (e.g. Basel II). Exclusions for the operational risk insurance product contain explicit language to avoid customer confusion. FIG. 8 further illustrates that all key risk mitigant triggers as required under Basel II regulations are met and adhered to in order for the Bank to qualify for capital relief from its regulators.

Figure 9:
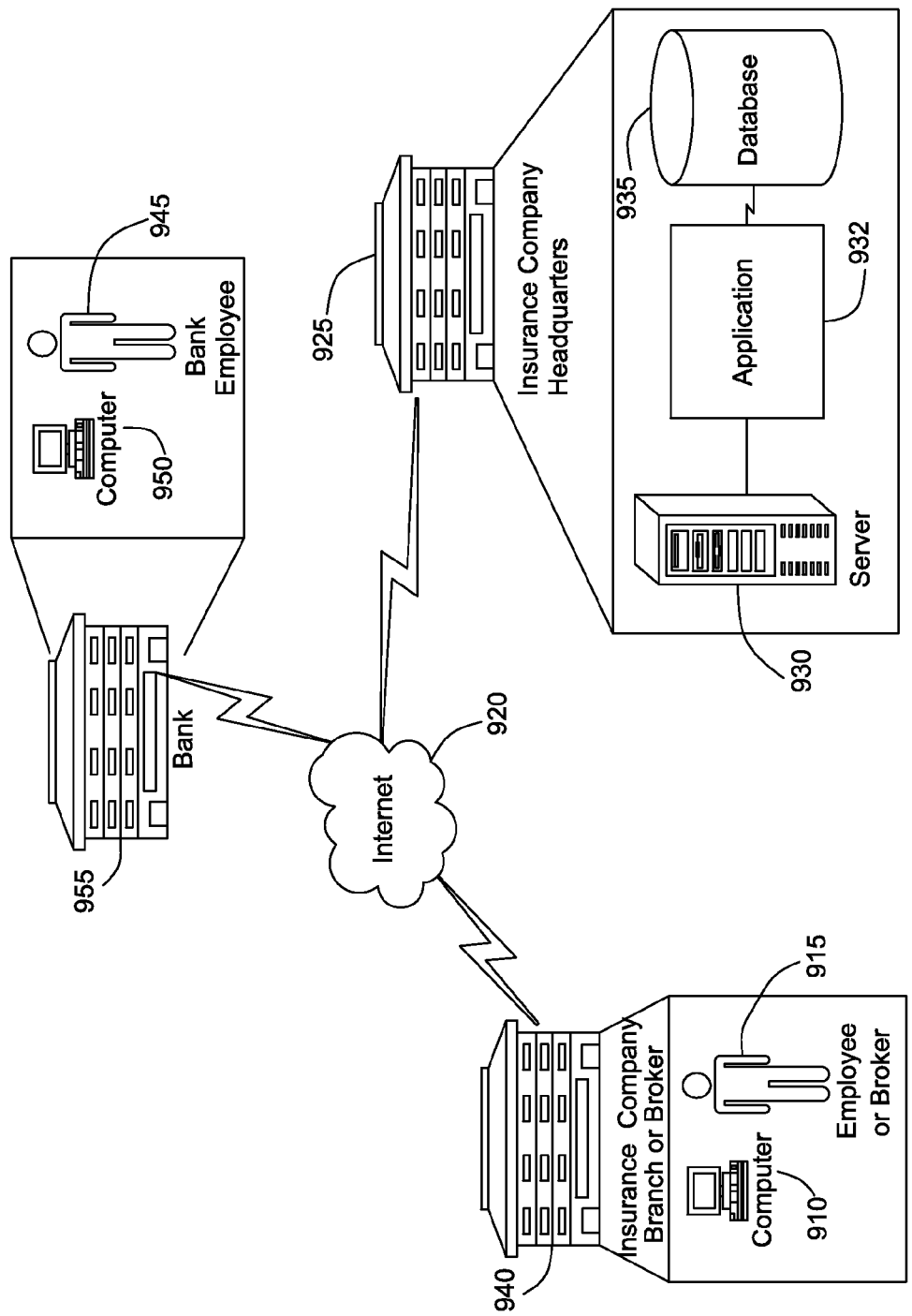
FIGS. 9-10 are block diagrams of a general system architecture for implementing an insurance product directed to operational risk in accordance with the disclosure.

FIG. 9 is a block diagram of the information exchange channels and roles of the insurance company as it interfaces with an insurance broker or representative and a prospective or current client. More specifically, an insurance company representative 915 may approach a client bank 955 to offer an operational risk insurance product so that the client bank can obtain relief, for example, of up to 20% of their capital reserved, for operational risk to be used for other areas of the business (improves their balance sheet, grows assets, etc). When the bank agrees to purchase operational insurance coverage, the insurance company or an approved intermediary 915 may request information from the client bank (through its employee 945) to assess the client bank's operational risk, write an insurance policy, and quote a price. This information request from the insurance broker 915 may be sent electronically across the Internet to the bank 955. One or more bank employees may respond electronically to the information requests. The insurance company or an approved intermediary may electronically forward the response to the information requests to an insurance company headquarters so that the insurance company may store the responses in one or more databases 935 being developed to build a future market pricing index for operational risk. The insurance company may use software applications 932 to analyze the responses and calculate the operational risk of the client bank and its peer group. Further, based on the operational risk, the insurance company drafts an insurance policy and quotes a price for the insurance coverage using software applications such as word processing and spreadsheet programs. The draft insurance policy and price quote may be electronically sent to the client bank across the Internet, or may alternatively be printed into hard copies using printers and mailed to the client bank in confidence.

Figure 10:
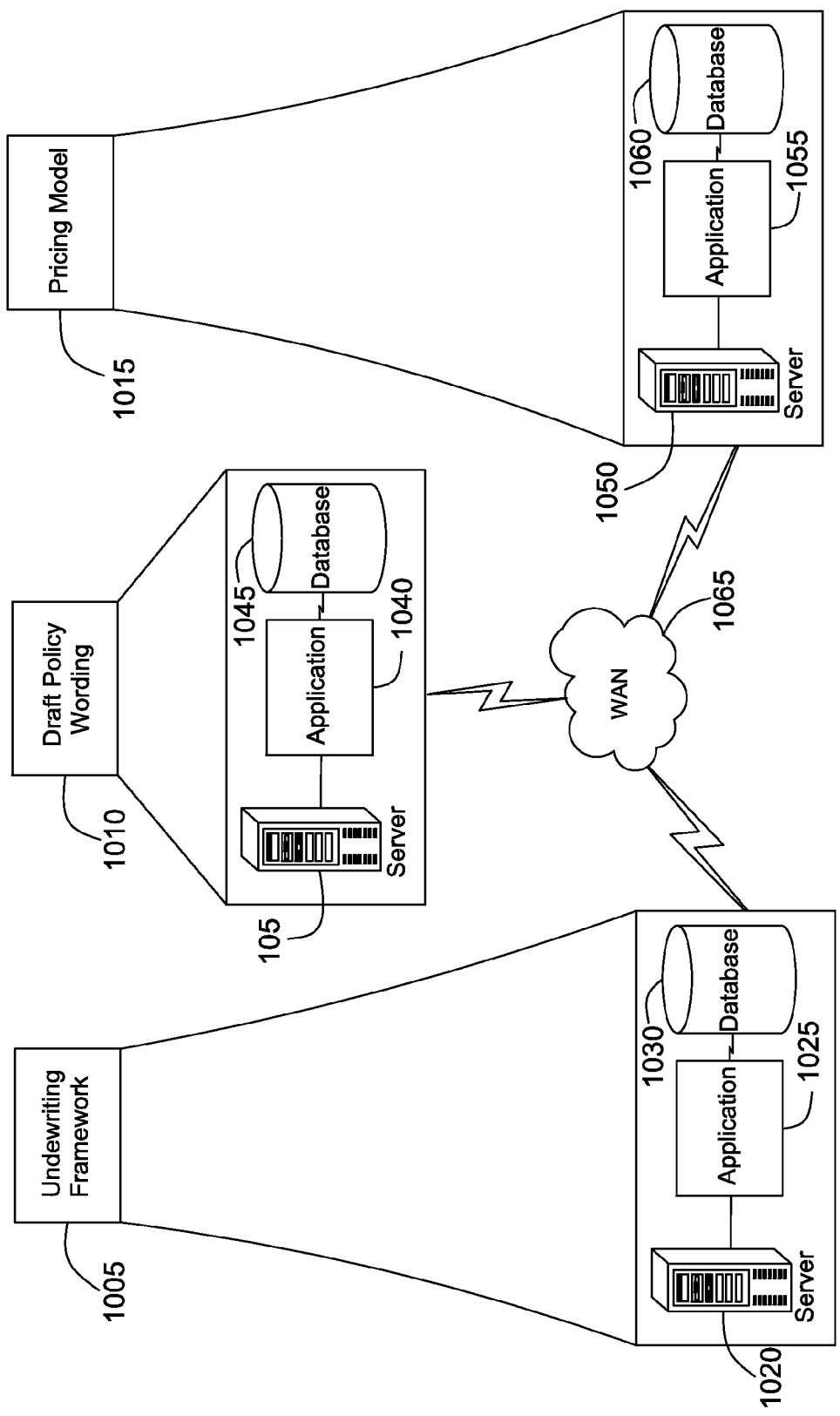

FIG. 10 is a block diagram illustrating a method for creating infrastructure to store and analyze information requests and also for expanding new operational risk market pricing index being developed by an insurance company in accordance with the disclosure. An aspect of the disclosure is the insurance company infrastructure needed to efficiently offer operational risk insurance to client banks. An exemplary infrastructure may have three distinct components: (1) the underwriting framework 1005 that assesses a client bank's operational risk; (2) the draft insurance policy including claims payment protocol 1010 directed to the assessed operation risk; and (3) a pricing model 1015 to quickly and accurately quote a price of the insurance policy to a client bank. Each infrastructure component may have servers (1020, 1035, and 1050) that implement software applications (1025, 1040, and 1055) accessing and analyzing information stored in a plurality of databases (1030, 1045, and 1060). The three distinct infrastructure components may be interconnected across a wide area network (WAN) 1065.

The underwriting aspect of the disclosure includes a blending of traditional underwriting considerations with a detailed assessment of the client's operational risk management, compliance and controls structure. Considerable time and resources are allocated to each assessment to ensure the client's operational risks are properly identified and mapped to the seven operational risk event as identified in, e.g. the Basel II accord, for the solution to meet the requirements and qualify for capital relief. These resources include not only physical components such as servers, software applications (e.g., word processors, spreadsheets, etc.) but also intellectual resources such as innovative underwriting techniques and actuarial methods.

In addition, the present disclosure provides a corresponding insurance policy template and claims payment protocol, which itself incorporates several novel and innovative features. An insurance policy template developed according to the invention allows the bank to transfer operational risk to an insurer in exchange for a premium. The policy may provide coverage against some of all of the following: external and internal fraud, employment practices and workplace safety, clients, products, and business practices, damage to physical assets, business disruption and systems failure, execution, delivery, and process management risks, and others. In one embodiment, a policy template will cover a variety of operational risks a bank or other financial institution may face. Although some or all of these risks may have been previously insured individually, prior approaches to operational risk did not provide a comprehensive product. The proposed policy product further includes a new and innovative claims payment protocol designed to give certainty of payment to clients. Such certainty may provide an insurance product as a cost effective alternative to retention of regulatory capital.

In one aspect, the disclosure provides new and innovative pricing structures for determining an appropriate premium payment amount based on specific attributes of a client. A technical pricing model is used to calculate the expected loss ratio of a client and the "technical" or theoretical break-even premium price required from client for the insurance cover. A capital pricing model is used to determine the value of capital relief to client bank and the stated market premium price required from client for the insurance cover.

Table 8 below illustrates an exemplary pricing model for an aspect of the disclosure. Using heuristic and actuarial methods, an insurance company determines a price for an operational risk insurance product. An insurance company selects a Target Expected Loss Ratio (TLR) of 50%. Typically, costs associated with commissions and overhead are estimated at 30% for purposes of this example to yield a profit of 20% for the insurance product. Each column of Table 8 represents a coverage layer. For example, the third column illustrates the premiums associated with a traditional insurance coverage of $1 billion complemented with an excess of operational risk coverage of $500 million.

An insurance company pricing model may provide several tiers of estimate (e.g. High, Medium, Low) to account for particular circumstances of a client bank. A low estimate may model the price such that a loss event occurs once every 100 years. Alternatively, a high estimate may model the price such that a loss event occurs once twenty five years. Typically, operation risk insurance coverages are renewed every five years. Therefore, a pricing model calculates five year premium as well as the annual premium.

TABLE 8

|Five Year Premium Indications by Layer, Expected Frequency, Asset Size, and Target Expected Loss Ratio|

Mid Estimate, Base Asset Size. $500M+ Return Period in Years = 50.000    Asset Size in $ Billions = 750.000

Target Expected Loss Ratio = 50.0%

Base Asset Size in $ Billions = 750.000

| | | $250M XS $250M | $500M XS $500M | $1B XS $500M | $500M XS $1B | $1B XS $1B |
|---|---|---|---|---|---|---|
| Low Estimate | Expected Loss Size in Layer:<br>Return Period in Years | $143,320.091<br>20.7 | $273,574.331<br>62.5 | $376,581.943<br>62.5 | $343,659.045<br>208.5 | $522,431.651<br>208.5 |
| Mid Estimate | Indicated 5 Year Premium<br>Indicated Annual Premium<br>Return Period in Years | $69,100.000<br>$13,820.000<br>16.6 | $43,800.000<br>$8,760.000<br>50.0 | $60,300.000<br>$12,060.000<br>50.0 | $16,500.000<br>$3,300.000<br>166.8 | $25,100.000<br>$5,020.000<br>166.8 |
| High Estimate | Indicated 5 Year Premium<br>Indicated Annual Premium<br>Return Period in Years | $86,400.000<br>$17,280.000<br>13.3 | $54,700.000<br>$10,940.000<br>40.0 | $75,300.000<br>$15,060.000<br>40.0 | $20,600.000<br>$4,120.000<br>133.4 | $31,300.000<br>$6,260.000<br>133.4 |
| | Indicated 5 Year Premium<br>Indicated Annual Premium | $108,000.000<br>$21,600.000 | $68,400.000<br>$13,680.000 | $94,100.000<br>$18,820.000 | $25,800.000<br>$5,160.000 | $30,100.000<br>$7,820.000 |

Substantial filtered data, which is collected from the client, allows an insurance company to build a comprehensive industry database of the insurable components of key operational risk events and considerations used primarily for benchmarking and to ultimately build a future alternative risk transfer market price index for operational risk.

A novel and innovative underwriting methodology and insurance product has been described. The methods and systems of the present invention provide approaches to determining operational risk, providing a comprehensive operational risk policy, and determining premium pricing. Although the foregoing embodiments of the invention have been described to assist a person of skill in the art, the invention is not limited to the provided details.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for underwriting an insurance product provided by an insurance company having servers and other electronic storage and computational devices for storing, retrieving, and processing information, the insurance product directed to insuring assets, the retention of which is governed by legislation, against operational risk of a client controlling the assets and engaged in transacting business in an industry, the method comprising the steps of:
    creating and storing a table in a server database by use of a computer, the table identifying a plurality of event categories of operational risk loss associated with the client's control of the assets based on pertinent legislative regulations of the industry;
    identifying at least one operational risk management component for each of the plurality of event categories, and updating the table in the server database by use of the computer to include the same;
    drafting at least one information request for each of the operational risk management components, and creating a checklist in electronic form by use of a computer program that includes the at least one information request;

electronically transferring the table and the checklist from the servers of the insurance company to servers of the client;

creating a database infrastructure on the servers of the insurance company for storing and analyzing information provided by the client;

populating the database infrastructure with client information provided by the client in response to the at least one information request;

analyzing the client information by using a computer to execute computer executable instructions to query and retrieve portions of the client information from the database infrastructure and analyze said portions using software applications operating on the servers of the insurance company, wherein analyzing the client information includes providing a plurality of scores, said scores are calculated using a computer program such that each of said scores corresponds to one of the plurality of event categories, and using the computer program to rank the client according to the plurality of scores;

determining an operational risk exposure assessment based on the analysis of portions of the client information stored in the database infrastructure;

calculating a value of capital relief based on the analysis of portions of the client information stored in the database infrastructure and by using statistical and scenario analysis software operating in the servers of the insurance company, wherein the value of capital relief represents capital retained by the client to offset identified operational risks; and drafting a proposal for the insurance product based, at least in part, on the operational risk exposure assessment, on the plurality of scores and on the value of capital relief.

2. The method of claim 1, further including the step of: transmitting the proposal from the servers of the insurance company to the servers of the client for electronic storage and retrieval.

3. The method of claim 1, wherein the plurality of event categories includes at least one of the following seven event categories:
   a) governance of a client organization;
   b) risk identification and assessment procedures of the client;
   c) risk monitoring procedures of the client;
   d) reporting procedures of the client;
   e) quantification of risk exposure by the client;
   f) risk appetite and risk aversion policies of the client; and
   g) assess use systems and controls of the client.

4. The method of claim 1, wherein identification of the plurality of event categories further includes the steps of:
   identifying a plurality of indicators indicative of an extent of organizational maturity of the client;
   drafting at least one additional information request for each of the plurality of indicators; and
   augmenting the checklist with the at least one additional information request.

5. The method of claim 1, wherein identification of the plurality of event categories further includes the step of identifying risk categories based on general underwriting considerations, which are selected by a computer program from the list consisting of governance of the client, investment banking activity of the client, treasury and trading activity of the client, and audit procedures of the client.

6. The method of claim 1, wherein each of the plurality of scores is between one and seven, wherein each of the scores is plotted on a radial chart using an electronic data manipulator application operating on the servers of the insurance company, and wherein an area within the radial chart for the client is compared by use of a computer application to statistical data compiled in the database infrastructure for the industry by the computer application.

7. The method of claim 1, wherein the client information includes information archived in the servers of the client relative to aggregated or individual loss events experienced by the client within a finite preceding period.

8. The method of claim 1, wherein the step of analyzing the client information includes assigning a maturity rating for each of the plurality of event categories of operational risk loss, the maturity rating being one of basic, average, and industry leading.

9. The method of claim 1, further including the step of calculating an expected loss ratio of the client based on the client information using software applications being executed on the servers of the insurance company.

* * * * *